United States Patent Office 3,382,211
Patented May 7, 1968

3,382,211
HEXAPHENYLDICHLOROTETRAPHOSPHO-
NITRILE-DIPHENOL POLYMERS
Irving I. Bezman, Pittsburgh, and Janet H. Smalley, Irwin, Pa., assignors to Armstrong Cork Company, Lancaster, Pa., a corporation of Pennsylvania
No Drawing. Filed Mar. 3, 1964, Ser. No. 349,171
3 Claims. (Cl. 260—47)

This invention relates to a method of reducing the functionality of a phenylchlorotetraphosphonitrile, $$[(C_6H_5)(Cl)PN]_4,$$

having the structure:

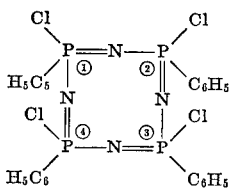

the synthesis of which is described in Bezman and Smalley, U.S. patent application, Ser. No. 165,937, filed Jan. 12, 1962, and now abandoned. In accordance with the method of this invention all or some of the chlorine atoms are replaced with phenyl groups. The replacement of the chlorine atoms with phenyl groups is accomplished by treating the phosphonitrile in inert solvents with phenyl lithium.

The process not only gives good yields of octaphenyltetraphosphonitrile, $[(C_6H_5)_2PN]_4$, but also gives two isomers of hexaphenyldichlorotetraphosphonitrile, $$P_4N_4(C_6H_5)_6Cl_2,$$

by the use of restricted amounts of phenyl lithium. The starting compound, $[(C_6H_5)(Cl)PN]_4$, is such that one of the two groups attached to the phosphorus atom is essentially above and the other below the ring. It is not known how the phenyl groups and chlorine atoms are arranged spatially in the parent compound. When all four chlorines are replaced by phenyl groups only one octaphenyltetraphosphonitrile can be formed. However, when conditions are adjusted to obtain hexaphenyldichlorotetraphosponitrile, several isomers are possible. For example, the two phenyl groups may replace chlorines on adjacent phosphorus atoms, i.e., $P_1$ and $P_2$, or on separated atoms, i.e., $P_1$ and $P_3$. Positional isomers are therefore possible. Further, chlorines on the same or opposite sides of the P–N ring may be replaced, resulting in cis-trans isomers. Our procedure for replacing two of the four chlorine atoms in the parent compound gives two such isomers, one melting at 215.5–217° C. and the other at 295–299° C. (Fisher-Johns block, uncorrected). They exhibit substantial differences in solubility properties so that separation and isolation of each in pure form is easily achieved. These isomeric difunctional compounds are important as starting monomers in the synthesis of polymeric materials incorporating phosphonitrile rings in the polymer chains and thus an ancillary object of this invention is the formation of novel polymeric compositions of matter.

In accordance with our invention, the phenylchlorotetraphosphonitrile is reacted with the phenyl lithium using an organic solvent reaction medium which is essentially inert to the reactants and to the reaction product. Preferably the reaction is carried out at the reflux temperature of the solvent reaction medium. Among the various solvents which may be used, either alone or as mixtures, are benzene, toluene, xylene, cumene, decalin, and anisole as solvents for the phosphonitrile. Although the phenyl lithium reagent is best prepared in an either such as diethyl ether or tetrahydrofuran, the ether solution can be diluted with a hydrocarbon solvent after the reagent has been formed. We prefer to dissolve the phosphonitrile in benzene and to add to it a solution of phenyl lithium in a mixture of diethyl ether and benzene containing 0–70% benzene. For full replacement of the chlorine atoms in the parent phosphonitrile we use four moles of phenyl lithium per mole of phosphonitrile. To obtain replacement of only two of the four chlorine atoms we accordingly use two moles of phenyl lithium per mole of phosphonitrile. Although the reaction will take place at temperatures between 50° and 150° C., we prefer to use 60–100° C.

After the reaction is completed, the mixture is cooled and filtered. From the precipitate the phosphonitrile of reduced functionality is separated by extraction with a suitable solvent, such as benzene, from the by-product, lithium chloride. Additional phosphonitrile of reduced functionality is obtained from the filtrate by concentration and the combined fractions may be further recrystallized from a suitable solvent to give a pure product.

The following examples will be illustrative of specific embodiments of the invention.

Example 1

An analyzed solution of phenyl lithium (0.053 mole), prepared from 1.70 grams of lithium and 17.3 grams of bromobenzene, in a mixture of 60 ml. of ether and 70 ml. of benzene, was added over 45 minutes to a slurry of 8.38 grams of phenylchlorotetraphosphonitrile (0.0133 mole) in 70 ml. of benzene at reflux. The reaction mixture was refluxed for an additional 15 minutes and allowed to cool slowly at room temperature with continued stirring. After removal of the solvent under vacuum, the solid residues were extracted repeatedly with boiling benzene. Concentration of the benzene solution gave 8.5 grams (an 80% yield) of $[(C_6H_5)_2PN]_4$, melting point 310–320° C., in three crops. The composition of the octaphenyltetraphosphonitrile product was verified by mixed melting with an authentic sample prepared from diphenylphosphorus trichloride and ammonium chloride. The infrared curve of the product was identical with that of the authentic sample.

Example 2

Replacement of two of the four chlorine atoms in the phenylchlorotetramer by phenyl groups was achieved successfully by treatment with two moles of phenyl lithium. Thus, an analyzed solution of phenyl lithium, (0.149 mole), prepared from 2.47 grams of lithium metal and 25.4 grams of bromobenzene, in 140 ml. of ether, was added under dry nitrogen to a refluxing solution of phenylchlorotetraphosphonitrile (44.7 grams, 0.0710 mole) in 1,800 ml. of benzene over a one-hour period. The reaction mixture was allowed to cool slowly to room temperature with continued stirring and then allowed to stand overnight under nitrogen. Filtration gave a tan delinquescent powder (I) and a pale yellow solution (II). The powder was washed repeatedly with distilled water to remove by-product lithium chloride. One recrystallization of the residue from benzene gave 10.74 grams of hexaphenyldichlorotetraphosphonitrile having a melting point of 285–295° C. The solution (II) was concentrated to 200 ml. and allowed to stand for several days, after which filtration gave an additional 2.89 grams of the hexaphenyldichlorotetraphosphonitrile having a melting point of 275–295° C. Combination of the fractions and recrystallization from benzene gave 12.64 grams (a 25% yield) of the pure hexaphenyldichlorotetraphosphonitrile isomer having a melting point of 297–300° C.

*Analysis.*—Calculated for $C_{36}H_{30}N_4P_4Cl_2$: C, 60.61; H, 4.24; N, 7.85; P, 17.37; Cl, 9.94. Found: C, 60.78; H, 4.45; N, 8.02; P, 17.09; Cl, 10.13.

The mother liquor was again concentrated, brought to boiling, and n-hexane was slowly added until turbidity took place. Sufficient benzene was then added to give a clear solution in which, after cooling, large crystals slowly formed over a period of several days. Filtration gave 7.30 grams of material which partially melted at 181° C., solidified, and remelted at 211–216° C. Two recrystallizations of the material from a benzene-hexane mixture gave 5.92 grams (an 11.7% yield) of a second isomer of hexaphenyldichlorotetraphosphonitrile having a melting point of 215.5–217° C. without change at 181° C.

*Analysis.*—Calculated for $C_{36}H_{30}N_4P_4Cl_2$ as above. Found: C, 60.59; H, 4.33; Cl, 9.72. The procedure gives a total yield of about 37% of the desired hexaphenyldichlorotetraphosphonitrile.

The hexaphenyldichlorotetramer isomers are of particular utility as starting reactants for the preparation of polymeric compositions and the dihalo derivatives may be reacted with polyhydroxy aromatic compounds such as diphenols, of which bisphenol-A (p,p'-isopropylidenediphenol) would be typical, hydroquinone and diphenolic acid esters such as 4,4-bis(p-hydroxyphenyl) pentanoate. The reaction of the dihalo derivatives with the polyhydroxy compounds yields novel condensation products incorporating the phosphonitrile rings in the polymer chains. They are the first reported examples of tetrameric cyclic dichlorophosphonitriles in which the chlorine atoms are attached to separate phosphorus atoms and in which all other exo-ring phosphorus bonds are with phenyl groups.

The following examples are illustrative of embodiments of this invention relating to the formation of novel polymeric compositions.

Example 3

1.933 grams of the hexaphenyldichlorotetraphosphonitrile isomer having a melting point of 215.5–217° C. ($2.71 \times 10^{-3}$ moles) and 0.618 gram of biphenol-A ($2.71 \times 10^{-3}$ moles) were ground together and transferred to a side-arm Pyrex glass tube which was heated in an oil bath. A stream of dry nitrogen was passed through the mixture by means of a capillary tube and the exit gases were led through a solution of 0.100 normal sodium hydroxide. The mixture was heated slowly and formed a melt at about 165° C. At the same time, hydrogen chloride was eliminated as indicated by a decrease in basicity of the trap. The mixture was maintained at about 170° C. for four hours, after which time about 57% of the theoretical amount of HCl expected through condensation of the reactants was eliminated. The final product was a solid which was soluble in butanol, acetone, and dimethylformamide. Solubility in dimethylformamide was immediate while solution in butanol and acetone took place more slowly. A coating solution was made by dissolving the reaction product in dimethylformamide at about 20% solids content. The solution was applied to a sheet of copper and heated to 130–140° C. to eliminate the solvent. The residual coating was transparent, colorless, and had high electrical resistance. A thermogram of the product indicated no weight loss until a temperature of 410° C. was reached. Total weight loss was about 43% after being held at 500° C. for 50 minutes. The product is particularly useful as an insulating coating for electrical systems exposed to elevated temperatures.

Example 4

The hexaphenyldichlorotetraphosphonitrile isomer having a melting point of 297–300° C. and bisphenol-A were ground together and reacted in the same manner as described in Example 3. In this case 67% of the expected HCl was eliminated and a final product was obtained which softened at 150° C. It was possible to apply the powdered product to a copper surface, heat the copper to a temperature somewhat above 150° C., thus allowing the product to flow out and form a high resistance insulating coating. The product thus has utility as a potting compound for electrical components and forms coatings of high electrical insulating properties at elevated temperatures. The product shows no weight loss up to a temperature of 450° C. and a total weight loss of about 43% after being held at 500° C. for 45 minutes.

We claim:

1. A linear polymeric product of high heat stability produced by the reaction of a hexaphenyldichlorotetraphosphonitrile in which the chlorine atoms are attached to separate phosphorous atoms and a dihydroxy aromatic compound selected from the group consisting of a p,p'-isopropylidenediphenol, hydroquinone, and a 4,4-bis(p-hydroxyphenyl) pentanoate.

2. A linear polymeric product in accordance with claim 1 in which the hexaphenyldichlorotetraphosphonitrile is the isomer melting at 215°–217° C. and in which the dihydroxy aromatic compound is p,p'-isopropylidenediphenol.

3. A linear polymeric product in accordance with claim 1 in which the hexaphenyldichlorotetraphosphonitrile is the isomer melting at 295°–299° C. and in which the dihydroxy aromatic compound is p,p'-isopropylidenediphenol.

References Cited

UNITED STATES PATENTS

| 3,121,704 | 2/1964 | Rice et al. | 260—54 |
| 3,169,933 | 2/1965 | Liu | 260—2 |
| 3,194,787 | 7/1965 | Redfarn | 260—47 |
| 3,230,252 | 1/1966 | Bezman | 260—551 |

FOREIGN PATENTS

| 812,126 | 4/1959 | Great Britain. |

OTHER REFERENCES

Herring et al.: J. Inorg. Chem. 3, 428–20 (1963) pub. date Feb. 27, 1963.

WILLIAM H. SHORT, *Primary Examiner.*

M. GOLDSTEIN, J. C. MARTIN, *Assistant Examiners.*